(12) United States Patent
Regni et al.

(10) Patent No.: US 9,152,648 B2
(45) Date of Patent: Oct. 6, 2015

(54) PROBABILISTIC OFFLOAD ENGINE FOR DISTRIBUTED HIERARCHICAL OBJECT STORAGE DEVICES

(75) Inventors: Giorgio Regni, Paris (FR); Jonathan Gramain, Paris (FR); Vianney Rancurel, La Frette sur Seine (FR); Benoit Artuso, Maisons Lafitte (FR); Bertrand Demiddelaer, Levallois-Perret (FR); Alain Tauch, Montrouge (FR)

(73) Assignee: SCALITY S.A., Paris (FR)

( * ) Notice: Subject to any disclaimer, the term of this patent is extended or adjusted under 35 U.S.C. 154(b) by 787 days.

(21) Appl. No.: 12/964,656

(22) Filed: Dec. 9, 2010

(65) Prior Publication Data
US 2011/0138131 A1    Jun. 9, 2011

Related U.S. Application Data

(60) Provisional application No. 61/285,019, filed on Dec. 9, 2009.

(51) Int. Cl.
| | |
|---|---|
| G06F 12/00 | (2006.01) |
| G06F 17/30 | (2006.01) |
| G06F 9/50 | (2006.01) |
| G06F 3/06 | (2006.01) |

(52) U.S. Cl.
CPC .......... *G06F 17/30221* (2013.01); *G06F 3/061* (2013.01); *G06F 3/065* (2013.01); *G06F 3/0649* (2013.01); *G06F 3/0667* (2013.01); *G06F 3/0685* (2013.01); *G06F 9/5077* (2013.01); *G06F 17/30949* (2013.01)

(58) Field of Classification Search
None
See application file for complete search history.

(56) References Cited

U.S. PATENT DOCUMENTS

| | | |
|---|---|---|
| 5,365,587 A | 11/1994 | Campbell |
| 5,708,715 A | 1/1998 | Vicard |
| 7,346,705 B2 | 3/2008 | Hullot |
| 7,383,291 B2 | 6/2008 | Guiheneuf |
| 7,437,516 B2 | 10/2008 | Wintergerst et al. |
| 7,451,275 B2 | 11/2008 | Petev et al. |
| 7,457,918 B2 | 11/2008 | Marwinski et al. |

(Continued)

FOREIGN PATENT DOCUMENTS

WO    2010036754 A1    4/2010

OTHER PUBLICATIONS

Karger et al., "Consistent Hashing and Random Trees: Distributed Caching Protocols for Relieving Hot Spots on the WOrld Wide Web", © 1997 ACM, p. 1-11.*

(Continued)

*Primary Examiner* — Brian Peugh
(74) *Attorney, Agent, or Firm* — Blakely Sokoloff Taylor & Zafman LLP

(57) ABSTRACT

A method and system having a probabilistic offload engine for distributed hierarchical object storage devices is disclosed. According to one embodiment, a system comprises a first storage system and a second storage system in communication with the first storage system. The first storage system and the second storage system are key/value based object storage devices that store and serve objects. The first storage system and the second storage system execute a probabilistic algorithm to predict access patterns. The first storage system and the second storage system execute a probabilistic algorithm to predict access patterns and minimize data transfers between the first storage system and the second storage system.

24 Claims, 18 Drawing Sheets

(56) References Cited

U.S. PATENT DOCUMENTS

| | | |
|---|---|---|
| 7,469,319 B2 | 12/2008 | Marwinski et al. |
| 7,493,449 B2 | 2/2009 | Marwinski et al. |
| 7,512,737 B2 | 3/2009 | Petev et al. |
| 7,516,277 B2 | 4/2009 | Kilian et al. |
| 7,522,284 B2 | 4/2009 | Sanders et al. |
| 7,539,821 B2 | 5/2009 | Petev et al. |
| 7,546,593 B2 | 6/2009 | Petev et al. |
| 7,552,284 B2 | 6/2009 | Petev et al. |
| 7,581,066 B2 | 8/2009 | Marwinski et al. |
| 7,653,828 B2 | 1/2010 | Kostadinov et al. |
| 7,694,065 B2 | 4/2010 | Petev et al. |
| 7,822,713 B2 | 10/2010 | Hullott |
| 7,831,634 B2 | 11/2010 | Petev et al. |
| 7,840,760 B2 | 11/2010 | Petev et al. |
| 7,877,356 B1 | 1/2011 | Guiheneuf |
| 7,933,947 B2 | 4/2011 | Fleischer et al. |
| 7,971,001 B2 | 6/2011 | Petev et al. |
| 7,991,637 B1 | 8/2011 | Guiheneuf |
| 7,996,615 B2 | 8/2011 | Galchev et al. |
| 8,028,002 B2 | 9/2011 | Petev et al. |
| 8,429,444 B2 | 4/2013 | Rancurel et al. |
| 8,612,960 B2 | 12/2013 | Petev et al. |
| 2002/0049685 A1 | 4/2002 | Yaginuma |
| 2003/0195940 A1 | 10/2003 | Basu et al. |
| 2005/0262164 A1 | 11/2005 | Guiheneuf |
| 2006/0031587 A1 | 2/2006 | Paterson |
| 2006/0143386 A1 | 6/2006 | Marwinski |
| 2007/0039054 A1 | 2/2007 | Mulla |
| 2008/0065718 A1 | 3/2008 | Todd et al. |
| 2009/0282196 A1 | 11/2009 | Petev et al. |
| 2009/0282395 A1 | 11/2009 | Petev et al. |
| 2010/0268881 A1 | 10/2010 | Galchev et al. |
| 2010/0287397 A1* | 11/2010 | Naor et al. .................... 713/324 |
| 2011/0138131 A1* | 6/2011 | Regni et al. .................... 711/133 |
| 2012/0036317 A1* | 2/2012 | Torii ............................... 711/108 |

OTHER PUBLICATIONS

Stoica, Ion, et al, "Chord: A Scalable Peer-to-peer Lookup Service for Internet Applications," SIGCOMM'01, Aug. 27-31, 2001, 12 pages.

Search Report in related European Patent Application No. 10836722.8, mailed Oct. 10, 2014, 7 pages.

Notification of International Preliminary Report on Patentability and Written Opinion in related PCT Application No. PCT/US2010/059782, mailed Jun. 21, 2012, 7 pages.

* cited by examiner

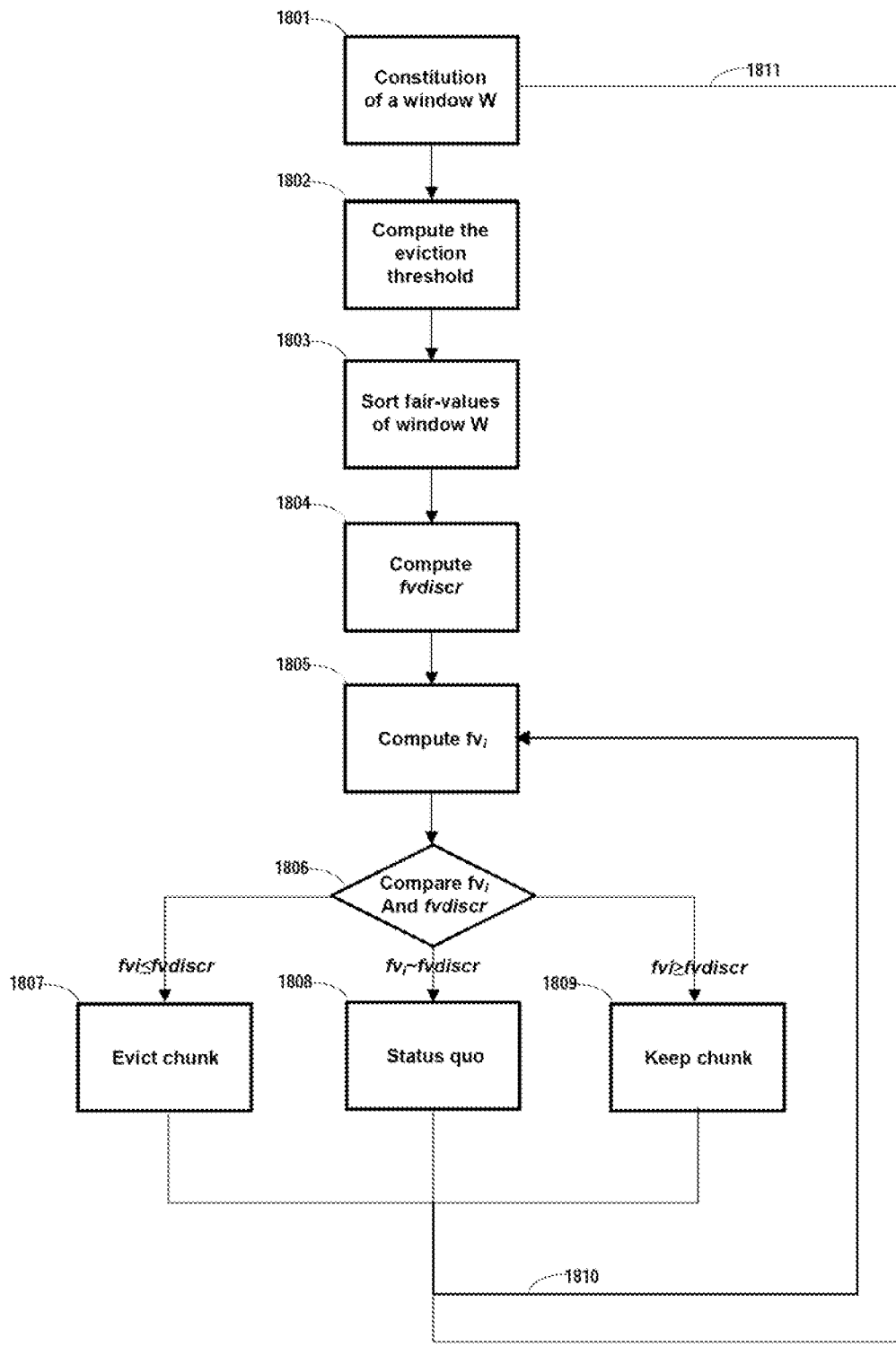

PROBABILISTIC OFFLOAD ENGINE FOR DISTRIBUTED HIERARCHICAL OBJECT STORAGE DEVICES

CROSS REFERENCE TO RELATED APPLICATIONS

The present application claims priority to U.S. Provisional Patent Application Ser. No. 61/285,019, filed Dec. 9, 2009, which is fully incorporated by reference herein.

FIELD

The field of the present system and method relates generally to computer storage systems. In particular, the present method and system are directed to a probabilistic offload engine for distributed hierarchical object storage devices.

BACKGROUND

As storage needs increase, solutions have to be found to drive the cost of storage down while maintaining ease of management. Prior solutions move complex storage management into dedicated storage systems. This saves application servers from embedding storage disks directly, and avoids potential inconveniences such as disk failure, data loss, data reconstruction, etc. This also enables economies of scale by managing a shared pool of storage resources more efficiently. Typical technologies include: SAN, Storage Area Networks where storage is centralized into large dedicated proprietary storage cabinets that export their storage capacity in the form of block device volumes, and NAS, Network Attached Storage where medium-sized storage devices export their disks as network file systems. Object stores that do not follow the centralized architecture design can be deployed on large clusters of generic servers, pushing fault tolerance on the software stack rather than onto dedicated storage hardware.

Because SAN technology is block-based, as opposed to file-based, and slices storage capacity into monolithic volumes, solutions derived from this technology cannot perform storage optimization based on the concept of files or objects. These solutions manipulate small, anonymous binary blobs called blocks with no metadata attached to them. Improvements such as thin provisioning, i.e., over-allocation of storage space for each volume to minimize the need for growing existing volumes have evolved. They, however, do not solve the problem at an architectural level and do not solve the underlying issues. For example, most file systems behave poorly with thin provisioning because the file systems assume that they have infinite space so, they do not reuse past blocks and waste space that cannot be reclaimed online, and they require scheduled maintenance down time.

SUMMARY

A method and system having a probabilistic offload engine for distributed hierarchical object storage devices is disclosed. According to one embodiment, a system comprises a first storage system and a second storage system in communication with the first storage system. The first storage system and the second storage system are key/value based object storage devices that store and serve objects. The first storage system and the second storage system execute a probabilistic algorithm to predict access patterns. The first storage system and the second storage system execute a probabilistic algorithm to predict access patterns and minimize data transfers between the first storage system and the second storage system.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

DESCRIPTION OF FIGURES

The accompanying drawings, which are included as part of the present specification, illustrate the currently preferred embodiment of the present invention and, together with the general description given above and the detailed description of the preferred embodiment given below, serve to explain and teach the principles of the present invention.

FIG. 18 illustrates an exemplary probabilistic chunk process, according to one embodiment.

Figure 1:
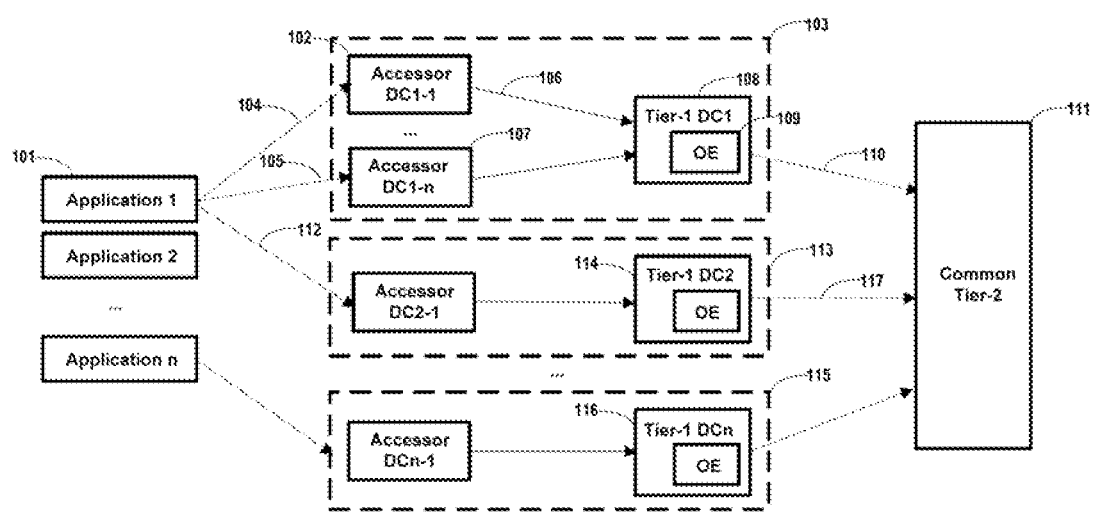
FIG. 1 illustrates a block diagram of a tiered storage system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The

DETAILED DESCRIPTION

A method and system having a probabilistic offload engine for distributed hierarchical object storage devices is disclosed. According to one embodiment, a system comprises a first storage system and a second storage system in communication with the first storage system. The first storage system and the second storage system are key/value-based object storage devices that store and serve objects. The first storage system and the second storage system execute a probabilistic algorithm to predict access patterns and minimize data transfers between the first storage system and the second storage system.

Object stores are reemerging and are placing emphasis on metadata and file awareness in order to allow for intelligence in storage solutions, including file access patterns and domain-specific metadata that can be utilized to implement per-file classes of storage. For example, an e-mail platform using an object store instead of a volume-based approach adds metadata declaring a message as legitimate, undesired, or high priority. The object store uses the metadata to change classes of storage appropriately. For example, the system may maintain one copy of illegitimate messages or keep high-priority messages in a cache for faster access.

The present system and method leverage object access patterns and metadata to achieve an intelligent hierarchical storage management process that automatically moves data between high-cost and low-cost object stores. Working at the object level instead of the block level, allows the linking together of storage systems that are loosely coupled and that do not share the same protocols or underlying storage technologies.

The present system and method provide a distributed replication-based storage front end acting as a caching layer and a probabilistic offload engine and an information dispersal-based storage back-end acting as a long-term, high-capacity storage layer. The present system leverages high-performance characteristics such as IOPS (IO operation per second) and throughput of replication-based storage. The present system benefits from lower cost, low-capacity overhead, and the flexibility of information dispersal solutions. The present system is transparent to the using application.

The present system relates to a device that can be seen as an HSM (hierarchical storage management) device or a cache device between a first layer called the Tier-1 and a secondary layer called the Tier-2. When configured as an HSM device, Tier-1 is the front layer and Tier-2 is the back layer. Data is off-loaded (or evicted) from Tier-1 to Tier-2 and uploaded from Tier-2 to Tier-1. Data can be probabilistically prefetched from Tier-2 to Tier-1. When configured as a cache device, Tier-1 is the cache layer and Tier-2 is the backing store layer. Data is evicted from Tier-1 to Tier-2 or replaced from Tier-1 (removed because already present on Tier-2). Moving data from Tier-2 to Tier-1 populates the cache. Data can be also probabilistically prefetched to the cache.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

FIG. 1 illustrates a block diagram of a tiered storage system, according to one embodiment. The present system includes many applications servers 101 remotely accessing a data center 103 through a WAN link (for example, Internet) 104. The connection endpoint is an accessor 102 that connects to one Tier-1 108 through a LAN link 106. Each data center 103 can be equipped with many accessors, for example, 107. Tier-1 uses an OE—Offload Engine 109—to connect to one Tier-2 111 through a WAN link 110. The present system also includes support for other Tier-1s 114 and 116 that could reside in different data centers 113 and 115 in various geographical locations. Each data center 103, 113, 115 has its own set of accessors. Applications could access multiple accessors through links 104 or 105, or access multiple data centers through link 112. All the Tier-1s, such as 108, 114, and 116 are connected to common Tier-2 111 through links 110 and 117.

Accessor 102 accesses Tier-1 with a REST (Representational State Transfer) protocol that supports three basic operations: GET, PUT, DELETE. This protocol is bridged to various other protocols required by applications such as HTTP, HTTPS (Secure Hypertext Transfer Protocol), WebDAV (Web-based Distributed Authoring and Versioning), or FUSE (File system in User Space). Accessor 102 can be a message storing platform, Web server and other service that requires storage of a very large number of objects.

Tier-1 acts as a cache layer and has to be fast. Accordingly, Tier-1 is equipped with memory and fast local disks. Memory is suited for caching a maximum number of objects (typically through the file system cache), and the disk provides a maximum number of I/O operations, maximum throughput, and very low latency (for example, 15K RPM, 73 GB disks). Tier-1 is based on a suitable replication-based storage cluster. A replication-based storage cluster is a set of storage nodes where applications store different backups of the same data. Each one of these backups is called a replica. Replication-based systems are fast because no attempt is made to compress and disperse objects. Instead, for ensuring data safety, objects are replicated. Unit operations of Tier-1 are PUT, GET, and DELETE, which respectively save objects, retrieve objects, and delete objects. Such a Tier-1 cluster could be implemented by using a consistent hashing ring, for example but not limited to, a Chord based network as described in "Chord: A Scalable Peer-to-peer Lookup Service for Internet Applications" by Ion Stoica, Robert Morris, David Karger, M. Frans Kaashoek, Hari Balakrishnan herein incorporated by reference.

Tier-2 111 can be any storage technology: SAN—Storage Area Network; Dispersed Storage Systems that might embed low-cost SATA disks; iSCSI; NFS; or other distributed storage systems (e.g., a consistent hashing ring or a Chord-based storage system) but is usually composed of much less expensive disks of larger capacity. Generally, Tier-2 storage systems 111 modifies an object's content to increase disk usage efficiency, (e.g., with compression) or to increase data safety, by dispersion (with IDA—Information Dispersal Algorithms). Unit operations of Tier-2 111 are PUT, GET, and DELETE and are implemented according to secondary storage media. For example, when secondary storage is mounted as an iSCSI or an NFS volume, PUT, GET, and DELETE operations are mapped to traditional POSIX file system operations. PUT, GET, and DELETE are particularly well mapped to Dispersed Storage Systems operations.

Both of these systems have scalability issues: Tier-1 is fast but wastes disk space; Tier-2 has high capacity but is generally slow. The present system bridges the two systems by using the present probabilistic and non-probabilistic algorithms along with synchronization protocols. As a result, to increase storage performance, nodes are added to Tier-1. To increase storage capacity, nodes are added to Tier-2. Their integration is seamless for accessor 102 and applications 101, which will see infinite storage capacity. Although this method is presented for sake of simplicity between one Tier-1 and one Tier-2, any number of storage layers from Tier-n to Tier-n+1 may be used. Accessors typically communicate with Tier-1, but any number of Tiers can be chained together and remain transparent to the application.

Objects are used for an application's persistent data storage. For example, office and multimedia applications that save the current work/state of the user may do so using objects. Historically these data were directly stored as named files on the local disks of the application computers. These files were stored in directories belonging to file hierarchies installed on the local disks. Now applications and storage need not reside on the same disks nor on the same computer. The historical naming conventions are not necessary anymore, nor is it required to store files in directories. For example, files could be indexed with numbers (keys) in a database and an application with a specific connector (for example, using HTTP—Hypertext Transfer Protocol or any other suitable protocols) could fetch files directly with key/value database methods. Also, because each application decides the binary data structure of the file and relies on the fact that it will retrieve exactly the same binary information as the time it stored it, the file can be seen as an opaque binary object by the various system components used for saving the file on persistent storage. The historical concept of a named file is not necessary for an application to access its persistent data.

The storage systems used for storing objects bound to keys are often named key/value store systems, and applications use keys to store and fetch object values (content). The goal of key/value store systems is to achieve the best performance in terms of data availability, access speed, and safety. Because key/value store systems view the entire content of objects, it is possible to perform transformations on them. For example, CRCs (Cyclic Redundant Checks), replication, compression, encryption, dispersion, packing, etc. may be performed.

A datum is identified with a unique tag (a key) and is bound to two objects: one data object and one additional metadata object that composes a 3-tuple (tag, datum, metadata) henceforth called a chunk. Metadata is a set of property (or a vector of variates) annotated X, which properties are annotated X{name of property}, such as datum access time: X{atime}; datum modification time: X{mtime}; metadata change time: X{ctime}; datum size: X{size}; chunk version: X{version}; chunk archive id: X{archid}; chunk archived version: X{archversion}; current status: X{status}. The special property X{status} can take a combination of the following values: "deleted," "archived," "cached." "Deleted" means a chunk is scheduled for physical deletion. "Archived" means datum could be removed from Tier-1 but datum is present in Tier-2 with X{archversion} equal to X{version}. "Cached" means datum is present both in Tier-1 and Tier-2 ("cached" implies chunk is "archived"). Cached chunks may be chunks with "cached" status, and archived chunks may be chunks with "archived" status. The present system also includes support for additional objects bound to a tag and can be expanded to an n-tuple: (tag, obj1, obj2, objn) where obj1 is data, obj2 is metadata, obj3 is e.g., user metadata, etc.

The offload engine ensures object synchronization between Tier-1 and Tier-2. If a datum object of a chunk is requested on Tier-1 and it is present on Tier-2 (because it has been previously off-loaded) then the offload engine fetches it from Tier-2 transparently. If a re-write occurs on a chunk in a Tier-1 corresponding datum object in Tier-2, an update may also occur. If a chunk deletion occurs on Tier-1, then the corresponding objects in Tier-2 (if they exist) are also deleted.

The offload engine ensures synchronization between all replicas of chunks (in Tier-1) including all replicas that have the same content. For example, if a datum object of a chunk has been evicted to Tier-2, then other replicas shall be notified and they will update their own metadata. Due to various system failures, there might be some differences in various objects among the replicas of a chunk, for some period of time. The present system, however, ensures that objects content is reconciled.

For ensuring synchronization, the metadata object of chunks remains in Tier-1. Even if the metadata object is a few bytes, Tier-1 nodes are able to keep a very large number of objects (of the order of magnitude of a billion per node). The present system ensures such an order of magnitude, for example, by using a database with ACID—Atomicity, Consistency, Isolation, Durability properties.

Typically a system administrator will specify an eviction ratio (for example, 30%) that ensures that 70% of Tier-1's disk space is being used. To satisfy this requirement on a distributed system with nodes having possibly various disk spaces, a probabilistic algorithm is used. The offload engine also includes non-probabilistic algorithms to satisfy other requirements. For example, one requirement may be that all new datum objects entered in Tier-1 shall be off-loaded on Tier-2 in a limited period of time. In such a case, the offload engine uses queues. The system administrator is able to configure the type of operations of the storage system.

Figure 2:
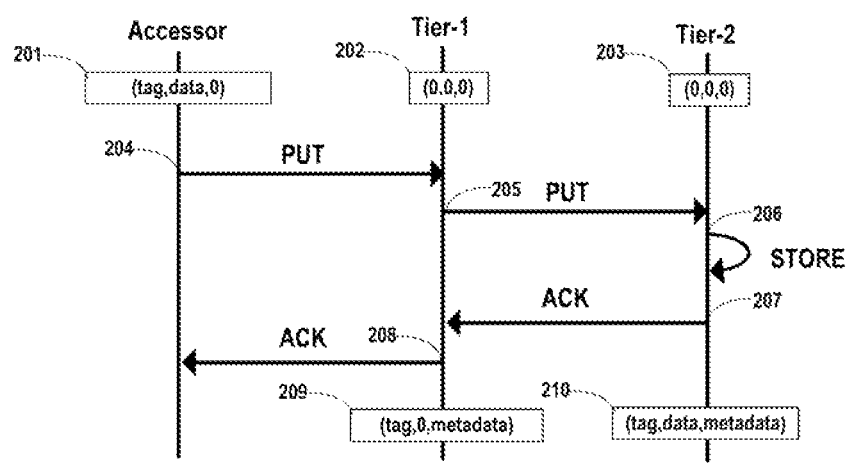
FIG. 2 illustrates an exemplary write through process, according to one embodiment.

FIG. 2 illustrates an exemplary write through process, according to one embodiment. For the write through mode, when an accessor 102 stores data for the chunk marked by a tag, it has no view of metadata 201. Tier-1 knows nothing about chunk 202 nor does Tier-2's chunk 203. Accessor 102 puts the data 204. Tier-1 acts as a bridge and forwards the PUT request "as is" to Tier-2 205. Tier-2 stores the data 206, and sends back an acknowledgment to Tier-1 207, which is immediately relayed to accessor 208. At the end of the operation, Tier-1 has created metadata bound to tag 209, marking the chunk as "archived" with identifier X{archid} and version X{archversion}, but holds no data. Data and a copy of the metadata are stored in Tier-2 210. PUT is successful when data is physically stored on Tier-2. In this mode, all data is guaranteed to be present on Tier-2.

Figure 3:
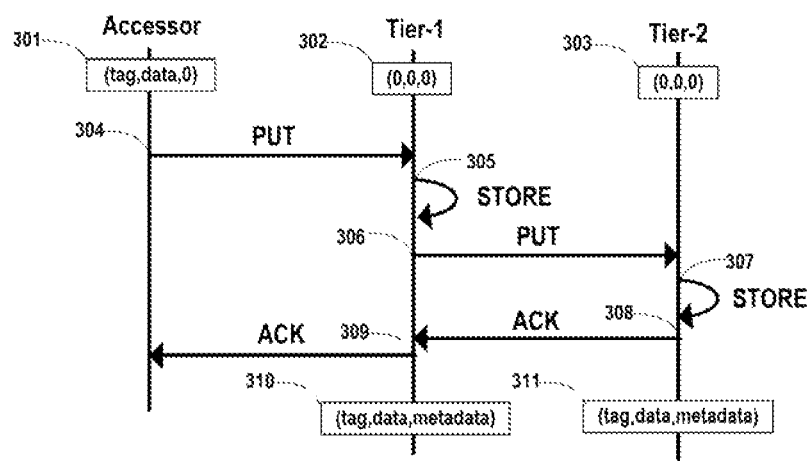
FIG. 3 illustrates an exemplary write cache process, according to one embodiment.

FIG. 3 illustrates an exemplary write cache process, according to one embodiment. For a write cache mode, an accessor 102 stores data for the chunk marked by a tag. Accessor 102 has no view of metadata 301. Tier-1 knows nothing about the chunk 302, nor does Tier-2 303. Accessor 102 puts the data 304. Tier-1 stores the data locally 305. It then forwards the PUT request "as is" to Tier-2 306. The latter stores the chunk locally 307 and sends an acknowledgement back to Tier-1 308. If the operation is successful, Tier-1 marks the chunk as "cached" and "archived" with identifier X{archid} and version X{archversion}, and sends an acknowledgement back 309. Tier-1 PUT is successful only when data is physically stored on Tier-2. In this mode, all data is guaranteed to be present on Tier-1 310 and Tier-2 311.

Figure 4:
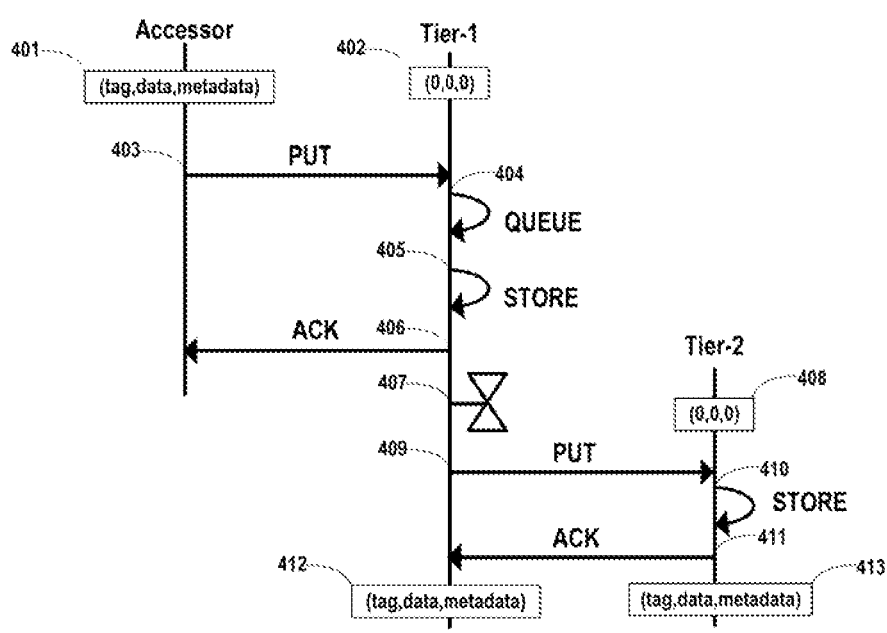
FIG. 4 illustrates an exemplary queued write cache process, according to one embodiment.

FIG. 4 illustrates an exemplary queued write cache process, according to one embodiment. For the queued write cache mode, when an accessor 102 stores data for the chunk marked by a tag, it has no view of the metadata 401. Tier-1 knows nothing of the chunk 402, nor does Tier-2 408. Accessor 102 "puts" the data 403. A chunk is inserted into a queue 404, and stored locally 405. An acknowledgement is sent back to accessor 406. The queue is processed 407 and the chunk is stored 409 to Tier-2 410. An acknowledgement is sent back to Tier-1 411. Tier-1 marks the chunk as "cached" and "archived" with identifier X{archid} and version X{archversion}. As a result, both Tier-1 and Tier-2 have the complete tuple 412, 413.

Figure 5:
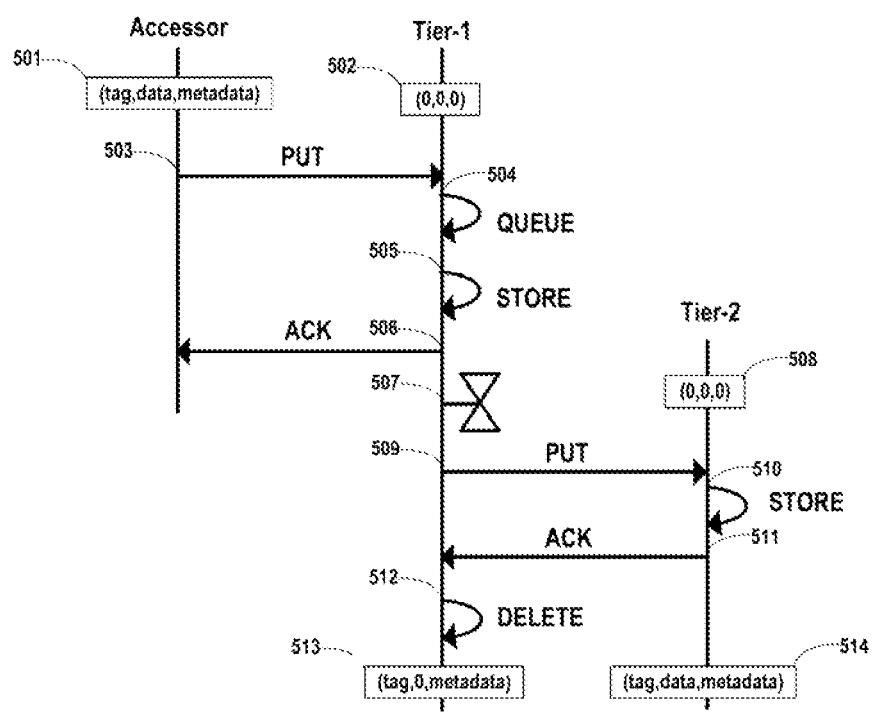
FIG. 5 illustrates an exemplary queued write back process, according to one embodiment.

FIG. 5 illustrates an exemplary queued write back process, according to one embodiment. For the queued write back mode, when an accessor 102 stores data for the chunk marked by a tag, it has no view of the metadata 501. Tier-1 knows nothing about the chunk 502, nor does Tier-2 508. Accessor 102 puts the data 503. Chunk 502 is inserted into a queue 504, and stored locally 505. An acknowledgement is sent back to accessor 506. The queue is processed 507 and the chunk 502 is stored 509 to Tier-2 510. An acknowledgement is sent back to Tier-1 511. Tier-1 then removes chunk data but marks chunk as archived with the identifier X{archid} and version X{archversion} 512. As a result, Tier-1 has no data information 513 but data is stored on Tier-2 514. This mode is similar to the write back mode, but writes to Tier-2 are queued. A constant throughput between Tier-1 and Tier-2 can be maintained.

Figure 6:
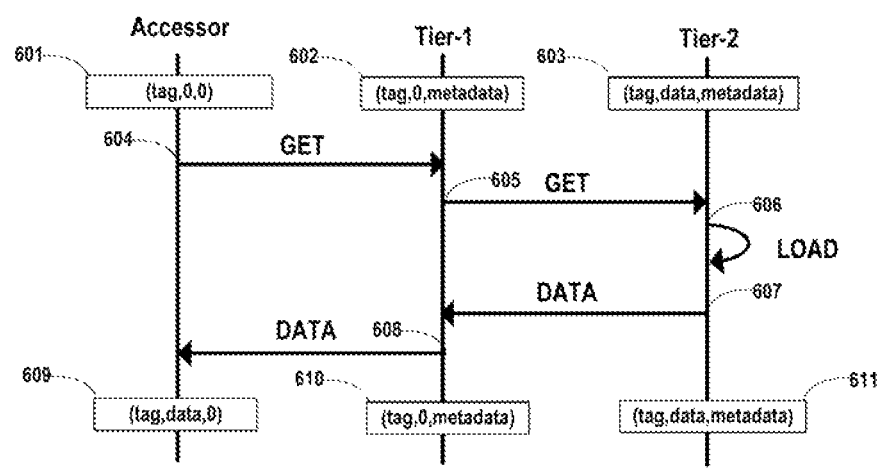
FIG. 6 illustrates an exemplary read through process, according to one embodiment.

FIG. 6 illustrates an exemplary read through process, according to one embodiment. For the read through mode, when an accessor 102 requests the content of chunk marked by tag 601, Tier-1 is in a configuration where data is not present 602. Data is present on Tier-2 603. Accessor 102 sends a GET operation 604. Tier-1 checks for chunk metadata and deduces the X{status} and X{archid} variates that indicate the location of the chunk in Tier-2, and relays the GET operation 605. Tier-2 loads the data 606 and sends it back 607. Tier-1 does not store data locally and relays data to accessor 608. As a result, accessor 102 gets the data 609, Tier-1 status is unchanged 610, Tier-2 status is unchanged 611. In this mode data is directly read from Tier-2. Chunks are not written in Tier-1.

Figure 7:
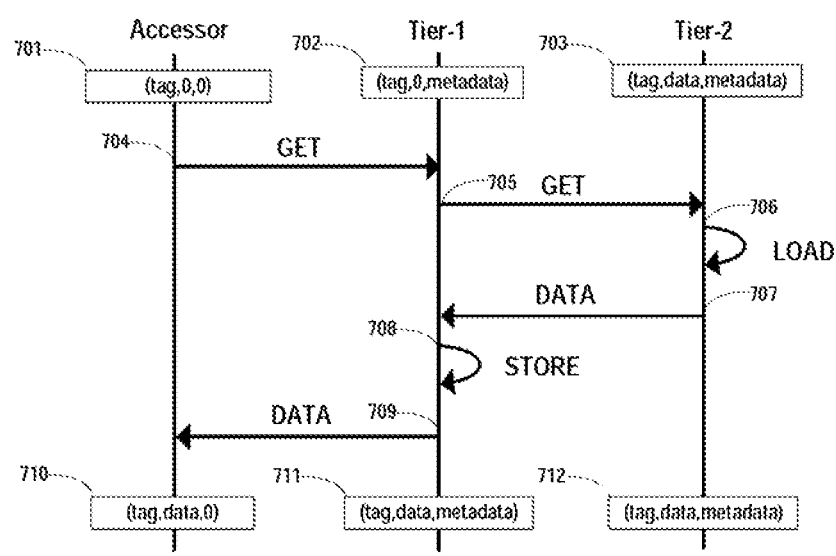
FIG. 7 illustrates an exemplary read cache process, according to one embodiment.

FIG. 7 illustrates an exemplary read cache process, according to one embodiment. For the read cache process, when an accessor 102 requests the content of chunk marked by tag 701, data is not present on Tier-1 702. Data is present on Tier-2 703. Accessor 102 sends a GET operation 704. Tier-1 checks for chunk metadata and deduces the X{status} and X{archid} variates that indicate the location of the chunk in Tier-2, and relays the GET operation 705. Tier-2 loads the data 706 and sends it back 707. Tier-1 stores data locally and marks the chunk as cached (it was already marked as "archived") 708. Data is then sent back to accessor 709. As a result, accessor 102 obtains data 710. Tier-1 has repopulated the data of the chunk 711, and data is still present on Tier-2 712.

Figure 8:
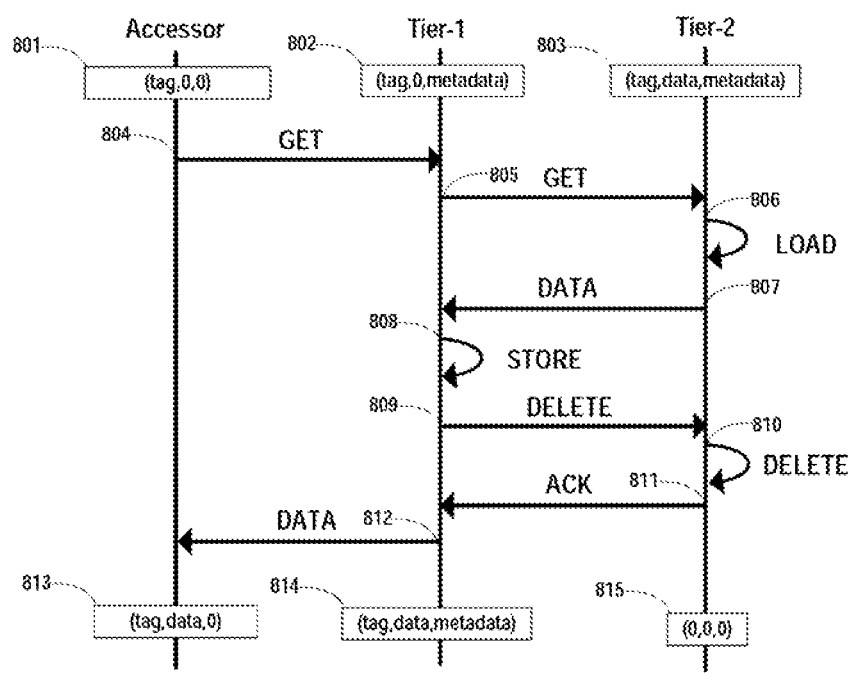
FIG. 8 illustrates an exemplary read back process, according to one embodiment.

FIG. 8 illustrates an exemplary read back process, according to one embodiment. For the read back mode, when an accessor 102 requests the content of a chunk marked by tag 801, data is not present at Tier-1 802. Data is present on Tier-2 803. Accessor 102 sends a GET operation 804. Tier-1 checks for chunk metadata and deduces the X{status} and X{archid} variates that indicate the location of the chunk in Tier-2, and relays the GET operation 805. Tier-2 loads the data 806 and sends it back 807. Tier-1 stores data locally and marks the chunk as "cached" (it was already marked as "archived") 808. Then it sends a DELETE operation to Tier-2 809. Chunk is deleted on Tier-2 810, and an acknowledgement is sent back 811. Tier-1 removes the "cached" and "archived" flags for the chunk and sends back the data 812. As a result, accessor 102 obtains the data 813, Tier-1 is fully repopulated 814 and Tier-2 chunk information is fully emptied 815.

Figure 12:
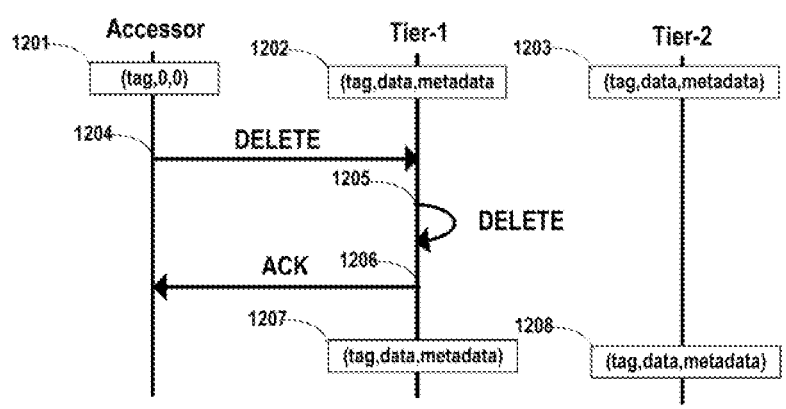
FIG. 12 illustrates an exemplary deletion process, according to one embodiment.

FIG. 12 illustrates an exemplary deletion process, according to one embodiment. For chunk "deletion," when an accessor wants to delete a chunk 1201, the chunk is fully populated in Tier-1 1202 and in Tier-2 1203. Accessor 102 sends a DELETE operation 1204. The chunk is marked as "deleted" 1205. This has no impact on physical deletion on Tier-1 nor on Tier-2. An acknowledgement is sent back to accessor 1206. As a result Tier-1 1207 and Tier-2 keep the chunks populated 1208. The sequence would have been the same if the data were not populated on Tier-1, because the action of Tier-1 is to mark the chunk as "deleted."

To manage disk space, when disk space becomes full (or reaches a predetermined ratio) Tier-1 starts off-loading data to Tier-2, and when disk space is underutilized, Tier-1 prefetches or caches data from Tier-2. When dealing with a huge number of objects, it is impossible to correlate metadata; instead a probabilistic approach is used.

If the most recent data were kept, if data access was roughly uniform, and if the bounds (atimemin, atimemax) of the access time variate X{atime} are known, it would be easy to estimate the probability that the datum would remain in Tier-1. Eviction ratio is the percentage of data to evict from the disks of Tier-1.

FIG. 18 illustrates an exemplary probabilistic chunk process, according to one embodiment. A collector process browses tags and constitutes a window W of n chunks 1801. Window size is computed by using Dvoretzky-Kiefer-Wolfowitz inequality, since it is operated on identically distributed fair-values. The size of the window can also be determined empirically and could be set larger than actually required without performance penalties.

For each window the total size of chunks in a window is maintained $$s_W = \sum_{i=0}^{n} X\{size\}_i.$$

T is the set of archived chunks that are not in cache and where their X{version} is equal to X{archversion}, and $s_{WT}$ is the total size of chunks that belongs to W and T. Then a ratio (cachedratio=$s_{WT}/s_W$) is computed to deduce an eviction threshold 1802: evictionthreshold=(1−cachedratio)+cachedratio. (useddisksize-(1-evictionratio)·(totaldisksize)/useddisksize. This corresponds to the ratio of data to evict out of total data (in terms of size). Evictionratio is the percentage of disk size that is let free on each Tier-1 node. Variables totaldisksize and useddisksize state total disk size and a used disk size, respectively.

Once the window is constituted, chunks composing the window are sorted by their fair-values 1803. The choice of the operation to perform on chunks is determined by using an ECDF—Empirical Cumulative Distribution Function—based upon the window W: If the window is large enough it accurately represents the average access patterns of all chunks contained in the storage system. Let Xi be random chunks taken over the total chunks of the system, and X{size}i be their size, then $$ECDF(v) = \left(\sum_{i=1}^{n} X\{size\}_i \cdot I(X_i \leq v)\right) / \left(\sum_{i=1}^{n} X\{size\}_i\right)$$

where v represents a calculated value from chunk variates called a fair-value. I(A) is the indicator of event A, which is 1 if an event occurs and 0 if an event does not occur. ECDF(v) gives the cumulated size of all chunks Xi that satisfies $X_i \leq v$. Based upon this assumption, a discriminant fair-value fvdiscr can be computed that will be used to differentiate chunks on the storage system. The special value fvdiscr is found by using a dichotomy on the following approximate equality:

$$s_W \cdot evictionthreshold \approx \sum_{i=0}^{j} X\{size\}_i$$

where j is the index of an element in ECDF with fair-value fvdiscr 1804.

Once fvdiscr is computed, the archive process starts processing other chunks on the system. The off-loader process iterates all the chunks Xi of the system and computes their fair-value fvi 1805 and compares it to the discriminant value fvdiscr 1806. If fvi is less than fvdiscr, then the chunk is evicted to Tier-2 (or replaced) 1807. If fvi is approximately equal to fvdiscr, it leads to a status quo or a noop (no operation). In this case the chunk status remains unchanged 1808. If fvi is greater than fvdiscr, then the chunk is kept on Tier-1 1809. The same window is reused for some number of chunks (chosen empirically) 1810. After some time (also chosen empirically) the window is reconstituted 1811.

The fair-value is a floating point indicator that provides an approximate decision on an operation to apply on a chunk. For example: −3 or less=off-load right now, −2=should probably be off-loaded, −1=may be off-loaded, 0=neutral, 1=seems to be wise to keep it, 2=should probably be kept, 3 or more=no offload. It is computed with the following calibration function:

$$fv_i = \sum_{c=0}^{C} w_c \cdot calibrate_c(X_i)$$

that is the weighted sum of C calibration functions calibratec( ) depending on various chunk variates. Weights $w_c$ allow for tuning and give more importance to some variates than others.

One of the most important variates involved in the computation of the fair-value is the CRF—Combined Recency and Frequency—described in LRFU and stored in the X{crf} variate. It is a floating point value calculated from access patterns of the chunk. The more recently and the more frequently the chunk is used, the higher this value will be. It uses an exponential approach to keep track of the history of access. It is possible to specify the weight of frequency over recency in a CRF calculation by specifying the time in seconds when an access will lose half of its importance. An access being this old will have half of its initial significance. An access being twice this old means it has a quarter of its initial significance, etc.). With curtime corresponding to the current time, for each chunk Xi a fair-value calibration is computed based upon an actuation of the CRF at curtime:

$$curcrf_i = e^{-\frac{ln2}{\lambda} \cdot (curtime - X\{atime\}_i)} \times X\{crf\}_i$$

where λ is the half-life parameter (period after which a hit loses half its significance). X{crf} is updated each time the chunk is read. An update consists in actuating and then incrementing the CRF; hence the formula:

$$X\{crf\}_i \leftarrow e^{-\frac{ln2}{\lambda} \cdot (curtime - X\{atime\}_i)} \times X\{crf\}_i + 1.$$

This annotation means that X{crf}$_i$ is replaced by a new value at the right of the arrow. This actuation reflects the number of hits. This update is done each time the chunk is read in the previous described operations.

The function crftofv( ) is the calibration function calculated from the CRF and is designed to transform the CRF as follows: a CRF of 100 will generate an indication of 3 (meaning no offload), a CRF of 0.18 will generate an indication of 0 (neutral), and a CRF of 10^-8 will generate an indication of −3 (offload right now). A scale is chosen for log(CRF) to be equivalent to log(number of hits) for a big CRF and log(log (CRF)) to be equivalent to log(age) for a small CRF (since the CRF is decreasing exponentially with time), hence the formula:

$$crftofv(crf) = \frac{1}{\gamma} \cdot \ln \left[ \frac{e^{\gamma \cdot crffairmin} + (e^{\gamma \cdot crffair1} - e^{\gamma \cdot crffairmin}) \cdot}{e^{\gamma \cdot log_{base}\left(\frac{crf}{crfval1}\right)}} \right]$$

where γ is a smoothing constant, (crfval1, crffair1) is a matching tuple, crffairmin is the minimum fair-value when CRF gets close to 0, and base is the user-chosen parameter for the base of the logarithm.

The function sizetofv( ) is a calibration function computed to take the chunk size into account with the idea that small chunks shall be kept in Tier-1 while big chunks shall be evicted as usual. The function is designed to perform as follows: a size of 10 KB will generate an indication of 3 (meaning no offload); a size of 400 KB will generate an indication of 0 (neutral); a size of 4.5 MB will generate an indication of −2 (should probably be off-loaded).

Scale is chosen to be −log(size), hence the formula: sizeiofv(size)=(sizefair2−sizefair1)·(ln(X{size}$_i$/sizeval1))/ (ln(sizeval2/sizeval1)) where (sizeval1,sizefair1) and (sizeval2,sizefair2) are matching tuples.

Other calibration functions that influence the fair-value may be by some statistical behavior analysis done upstream of the storage. It is possible to detect some usage patterns, e.g., to improve service to some VIP users by systematically keeping their files in Tier-1, or to never keep files with a specific marker in Tier-1 (e.g., files stored for pure archival purpose, etc.).

Figure 9:
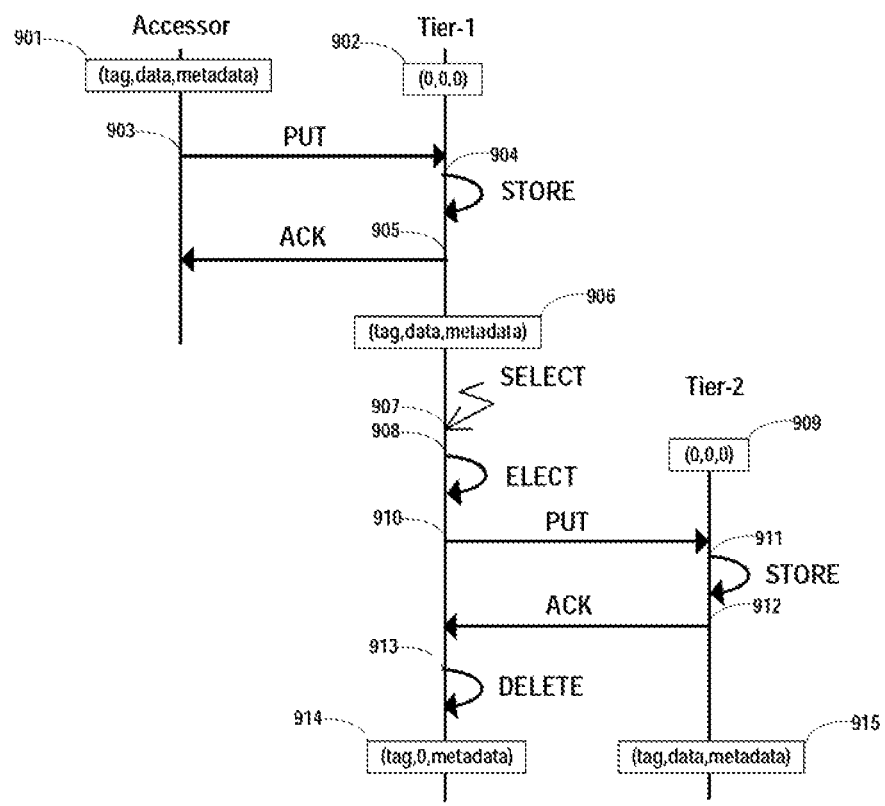
FIG. 9 illustrates an exemplary probabilistic write back process, according to one embodiment.

FIG. 9 illustrates an exemplary probabilistic write back process, according to one embodiment. For the probabilistic write back mode, when an accessor 102 wants to store data for the chunk marked by a tag, it has no view of the metadata 901. Tier-1 knows nothing about the chunk 902; neither does the Tier-2 909. Accessor puts the data 903. Tier-1 stores the chunk locally 904 and sends back an acknowledgement to accessor 905. Tier-1 is fully populated 906. Later, the off-loader process selects the chunk 907 and supposing its fvi is less than fvdiscr, it chooses it to be off-loaded 908. Tier-1 sends a PUT operation on Tier-2 910; Tier-2 stores the data 911 and sends an acknowledgement back 912. Tier-1 marks the chunks as "archived" with identifiant X{archid} and version X{archversion} and deletes the data locally 913. As a result, Tier-1 has no data information 914, and Tier-2 has data information 915.

Figure 10:
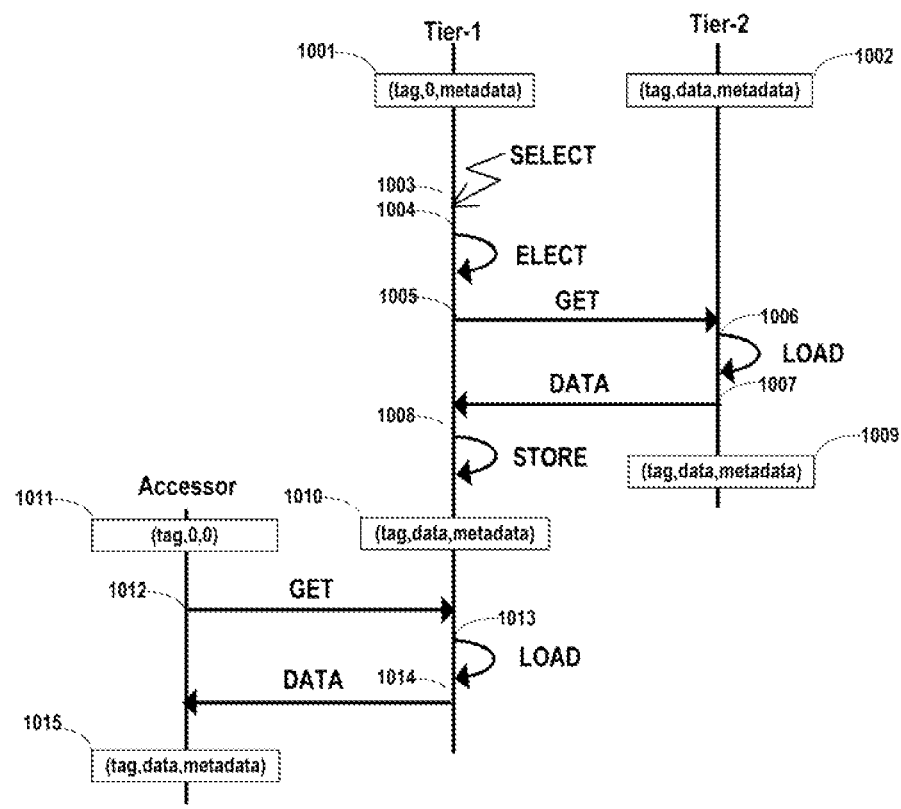
FIG. 10 illustrates an exemplary probabilistic prefetch cache process, according to one embodiment.

FIG. 10 illustrates an exemplary probabilistic prefetch cache process, according to one embodiment. For a "probabilistic prefetch cache" mode, chunk data is not present on Tier-1 1001 but present on Tier-2 1002. The off-loaded process selects the chunk 1003. The chunk is chosen to be prefetched 1004. Tier-1 sends a GET operation 1005; Tier-2 loads the data 1006 and sends them back 1007. Tier-1 stores data locally 1008 and marks them as "cached" and "archived" with identifier X{archid} and version X{archversion}. Tier-2 status remains unchanged 1009. Tier-1 is now populated with data 1010, so when an accessor 1011 sends a GET operation 1012, data can be directly loaded from Tier-1 1013 and sent back to accessor 1014. As a result, accessor 1011 obtains data 1015. Prefetch operation could happen if disk space on Tier-1 is underutilized, e.g., after adding new storage nodes in Tier-1 and when chunks are rebalanced.

Figure 11:
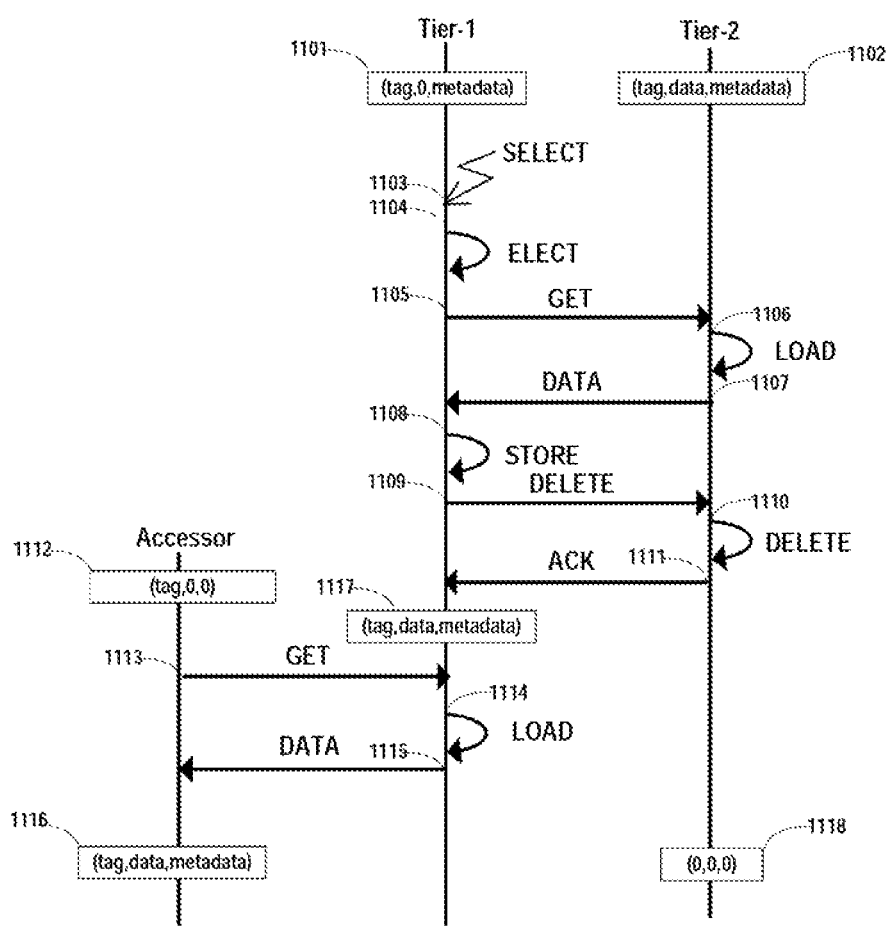
FIG. 11 illustrates an exemplary probabilistic prefetch process, according to one embodiment.

FIG. 11 illustrates an exemplary probabilistic prefetch process, according to one embodiment. For a probabilistic prefetch back mode, chunk data is not present on Tier-1 1101 but is present on Tier-2 1102. The off-loaded process selects the chunk 1103. The chunk is chosen to be prefetched 1104. Tier-1 sends a GET operation 1105; Tier-2 loads the data 1106 and sends it back 1107. Tier-1 stores data locally 1108 and marks it as "cached" and "archived" with identifiant X{archid} and version X{archversion}. Tier-1 then sends a DELETE operation to Tier-2 1109. The latter deletes the chunk 1110 and acknowledges the operation 1111. Upon receipt of the acknowledgement, Tier-1 removes the "archived" and "cached" flags. When the accessor 102 wants to get the chunk 1112, it sends a GET operation 1113; Tier-1 loads the chunk data 1114 and sends it back 1115. As a result, accessor 102 obtains data 1116, Tier-1 is fully populated 1117 and Tier-2 chunk information is emptied 1118.

In HSM mode, write back and read back modes are used. Datum objects are removed from Tier-1 once they have been off-loaded to Tier-2 and removed from Tier-2 when they have been uploaded to Tier-1. In cache mode, write cache and read cache are used. Datum objects are always kept in Tier-2 and could be or not be in Tier-1. It is possible to combine some operation modes. For example, in a message store deployment, a combination of queued write cache and probabilistic write back modes is used. All new messages are backed up on Tier-2 after, for example, 24 h, but additionally a background process will empty or populate the cache depending on available disk space and users' needs.

When an operation fails, the behavior will be different according to the type of operation. In the case of a write through or a write cache mode, Tier-1 PUT will fail. In other modes—for example, queued write cache, queued write back, or probabilistic write back—accessor 102 has no further information on the behavior of the overall operation. The chunk is stored locally in a queue on Tier-1, and any operation on the chunk is retried until it is successful on Tier-2.

Tier-1 can gracefully handle the write load when Tier-2 is unavailable. Typically, for a message store system it can be a few days. This delay depends on write load and available disk space on Tier-1 nodes. If data is no more present in Tier-1 (archived), data won't be available for reading during Tier-2 downtime. As a result of the software architecture, recent objects (messages, documents) will be available. As a result of LRFU, popular objects will remain available.

Generally, Tier-2 systems are more efficient with large chunks, (e.g., when storing electronic mail messages). Average sizes might be 50 KB, but an efficient size for a Dispersed Storage System would realistically be around 4 MB. For this reason, the present system includes a mechanism for packing chunks. Instead of chunks being sent directly to Tier-2, they are sent to a temporary queue that will be packaged into various file formats (UNIX tar archive, itself optionally packed using popular compression format, e.g., GZIP, LZMA) and finally sent. In this case, the accessor confides deterministic control of the chunk stored on Tier-1, using in queue write cache, queue write back, and probabilistic write back modes. Failures that occur when putting archives on Tier-2 are retried. For each pack file (archive) that is created, a specific information chunk named "archive chunk" is created in the Tier-1. This is useful to keep track of archives. Tier-1 does not directly delete chunks from Tier-2 but logs delete operations into the "archive chunk." Archives are relocated when too many chunks are marked as deleted within an archive chunk.

The present system also addresses the problem of multiple data centers, which is crucial in the context of professional offerings over the Internet, especially for Internet service providers and large Web merchants. They require that storage systems survive one or more data center crashes. In the present system, Dispersed Storage Systems are used to store information on Tier-2. The storage is naturally dispersed, rack aware, and data center aware; metadata information is replicated on the Tier-1.

Figure 14:
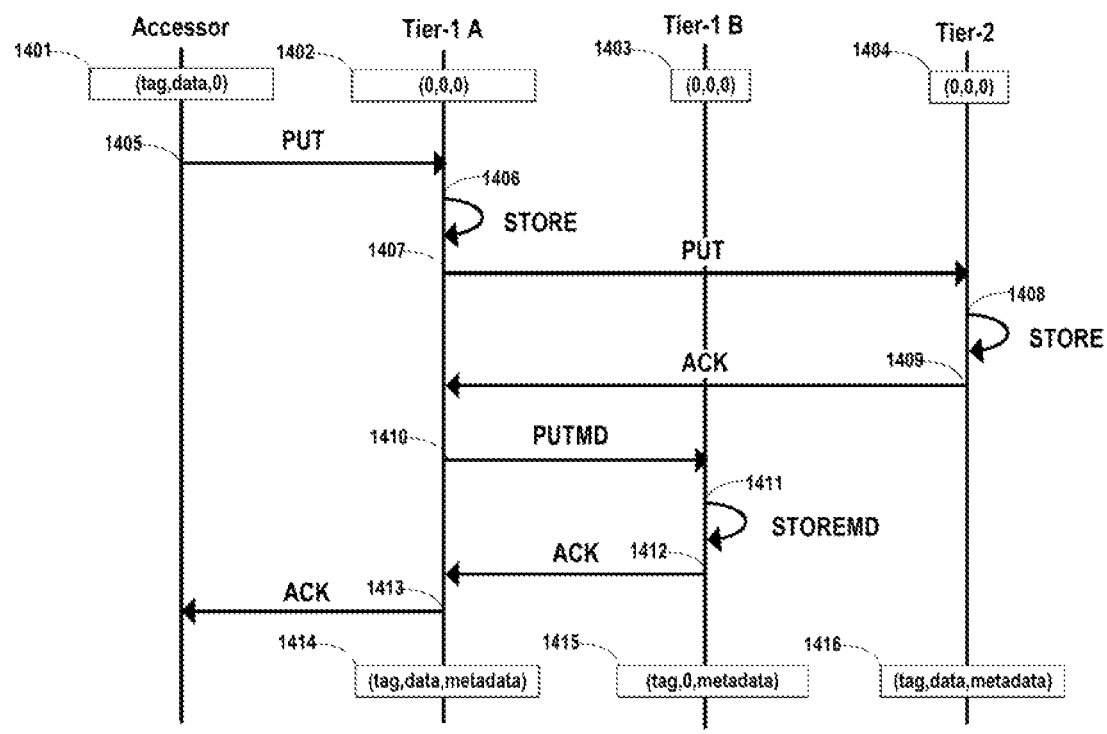
FIG. 14 illustrates an exemplary synchronization process, according to one embodiment.

FIG. 14 illustrates an exemplary synchronization process, according to one embodiment. The present system supports synchronization between many Tier-1 data centers, when accessor 102 puts data 1401, neither Tier-1 A, Tier-1 B, or Tier-2 has any information on tag 1402, 1403, 1404. Accessor sends a PUT operation 1405. Tier-1 A stores it 1406. Tier-1 A then sends a PUT to Tier-2 1407. The latter stores it 1408 and sends back an acknowledgement 1409. Tier-1 A marks the chunk as "cached" and "archived" with identifiant X{archid} and version X{archversion}, then sends a special PUTMD operation that will store metadata on Tier-1 B 1410. The latter stores the metadata in its local key space 1411, and sends back an acknowledgment 1412. The operation is now validated. Tier-1 A sends an acknowledgement back to accessor 1413. As a result, Tier-1 A has the full tuple 1414; Tier-1 B has metadata information on the chunk (enough information to fetch it from Tier-2) 1415; and Tier-2 has full information 1416.

Consistent hashing ring based storage systems address the problem of scalability by spreading the load among a huge number of servers, especially with Chord based storage systems, a sophisticated overlay routing protocol over a consistent hashing algorithm.

According to one embodiment, a consistent hashing ring used as a storage device uses a transactional approach that guarantees ACID properties on the object store. Failover capability guarantees data availability when a storage node fail.

The use of consistent hashing makes it possible not to disrupt the network topology when adding or removing nodes, reducing data movement. The current approach of tiered storage improves the usage of consistent hashing. If due to hashing, a Tier-1 node is more heavily loaded than others, then its eviction threshold will also be higher than the others.

When re-writing data is overridden, the variates X{version} is incremented. While putting, the system's behavior is similar as for a new chunk. Version reconciliation is done by accessor 102 when reading all the metadata of a chunk (through reserve calls), or by a rebuild mechanism.

Figure 16:
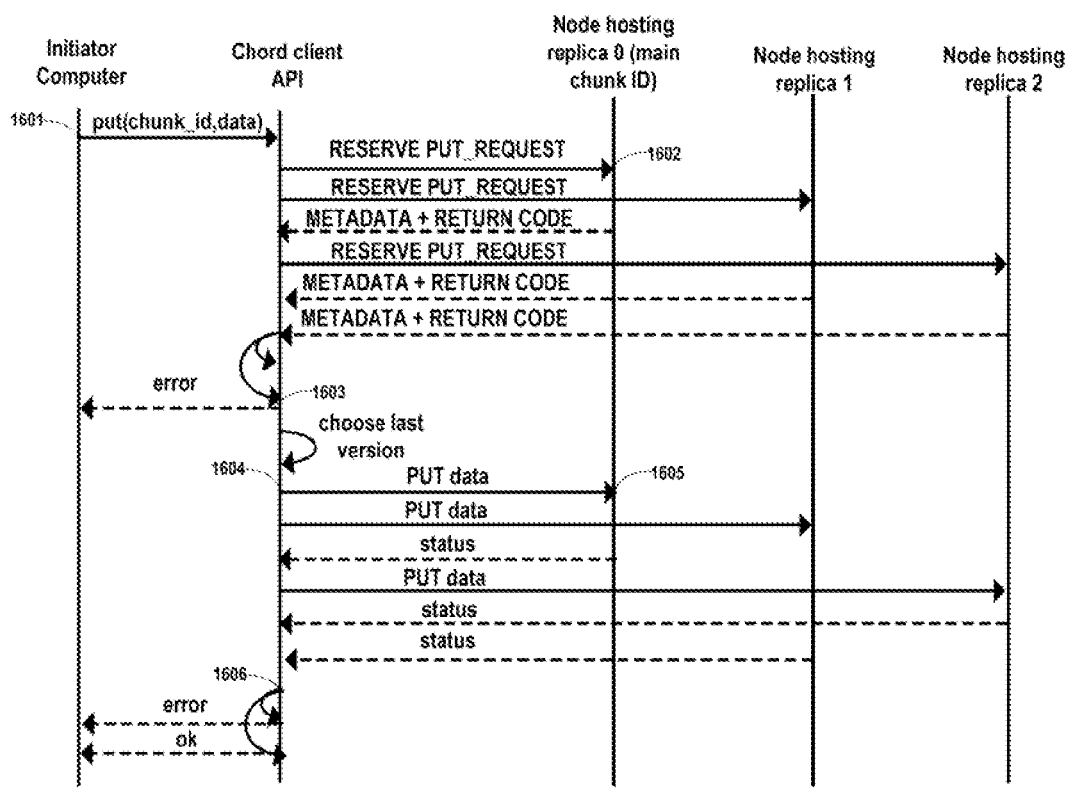
FIG. 16 illustrates an exemplary put process, according to one embodiment.

FIG. 16 illustrates an exemplary put process, according to one embodiment. The put process complements the PUT operation operated on a consistent hashing ring (e.g. Chord) used as a storage system: The initiator computer wants to store a chunk 1601. The client API sends a reserve operation to all storage nodes hosting replicas. Each replica sends the metadata back to the client 1602 containing the variate X{version}. Chunks are then locked on each storage node. If any of the reserve operations fail, then the full operation is canceled 1603, and an opcode cancel is sent to the storage nodes to unlock the chunks. Data is then sent to all storage nodes with X{version} reconciliation (greater X{version} is chosen) 1604. Storage nodes save new data with new metadata information 1605. Operation succeeds when all PUT succeeds; else it returns an error 1606.

Figure 15:
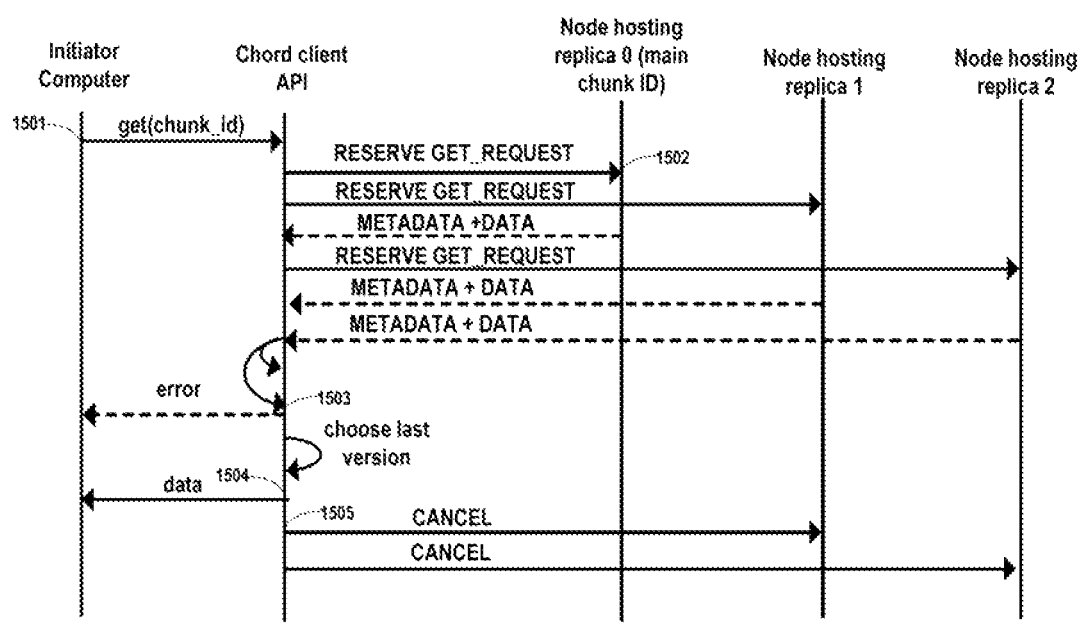
FIG. 15 illustrates an exemplary get process, according to one embodiment.

FIG. 15 illustrates an exemplary get process, according to one embodiment. Unlike the immutable version that can answer data coming from any of the storage nodes, a client API waits for all answers and does version reconciliation. An initiator computer wants to get a chunk by its chunk id 1501. Client API sends a reserve request to all storage nodes hosting replicas 1502. Storage nodes lock chunks and send back data and metadata bound to the chunks (or errors). Upon receipt of metadata, client API decides to return an error (if at least one reserve failed) or chooses the latest version if all reserves succeeded 1503. While data is sent back to caller 1504, other chunk instances are unlocked with cancel opcode 1505.

In the context of a mutable object store and when proxies are set, reserve operations perform a CHECK_LOCAL in all cases even if the chunk is present on the storage node, because a chunk with more recent X{version} could reside on the proxy node. In the same manner, storage nodes sending GET_LOCAL operations update their data when they detect a more recent version on the proxy.

The "original" replicas (numbered 0) of chunks are treated for off-loading. When replica 0 is missing, it will be rebuilt and off-loaded later. When a chunk is off-loaded, the variates X{version} is incremented. This implies replicas will be rebuilt with new metadata particularly X{archid} and X{archversion} for fetching data on Tier-2.

Figure 13:
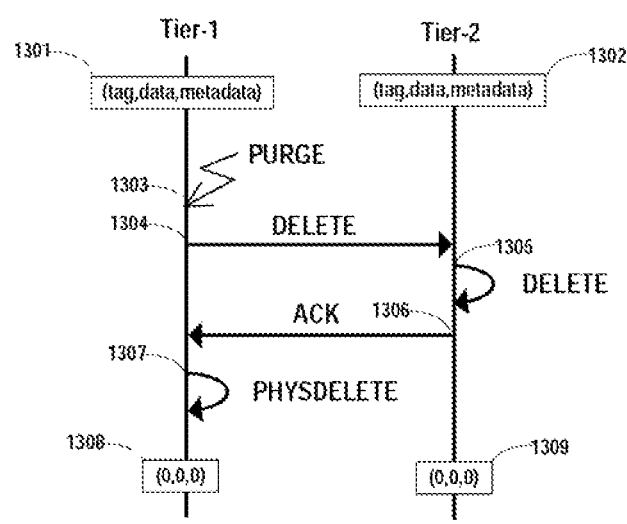
FIG. 13 illustrates an exemplary chunk purge process, according to one embodiment.

FIG. 13 illustrates an exemplary chunk purge process, according to one embodiment. PURGE operations are scheduled from time to time 1303 to physically delete chunks marked as "deleted." Supposing Tier-1 and Tier-2 are fully populated 1301 and 1302 and Tier-1 sends a DELETE operation to Tier-2 1304. The latter physically deletes the chunk 1305 and sends back an acknowledgement 1306. Tier-1 then physically deletes the full tuple 1307. As a result, Tier-1 and Tier-2 have no more information on chunks 1308 and 1309. In the case of missing data in Tier-1 (archived state) the sequence would have been the same since Tier-1 has enough information to send the DELETE operation on Tier-2, except that it would not physically delete the chunk data but deletes the metadata.

Figure 17:
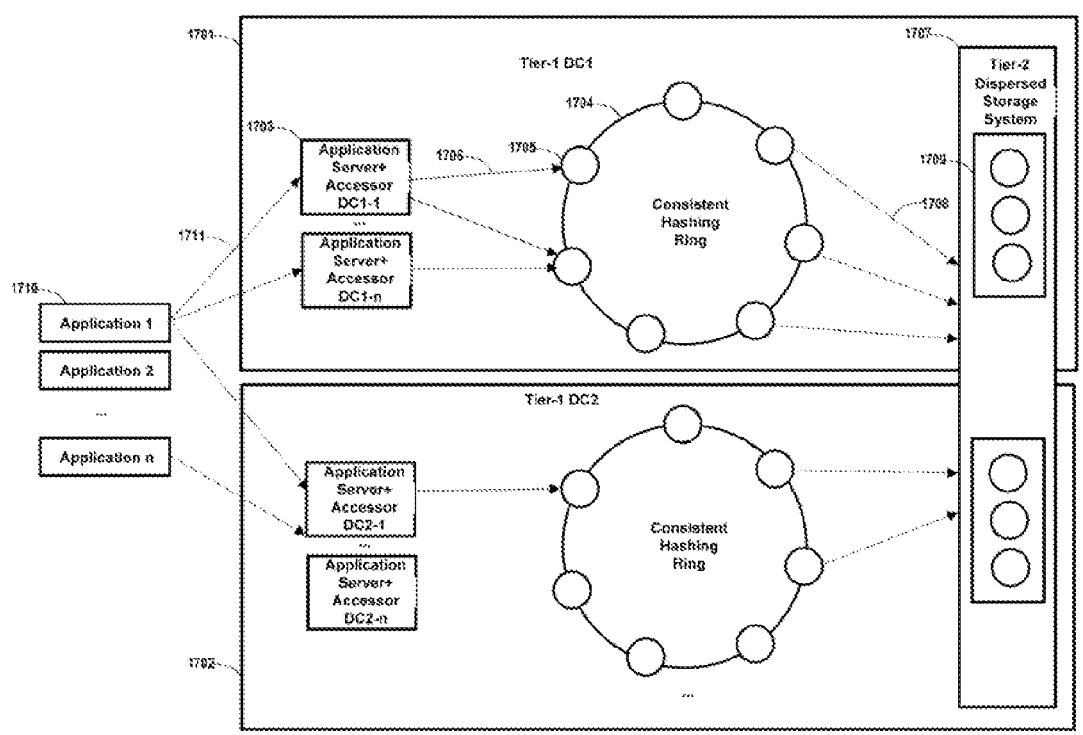
FIG. 17 illustrates an exemplary consistent hashing ring used as a clustered storage system, according to one embodiment.

FIG. 17 illustrates an exemplary consistent hashing ring used as a clustered storage system, according to one embodiment. The present system includes two data centers 1701 and 1702 located in different geographical locations having accessors embedding application programs (for example, mailbox daemons) 1703, accessing a consistent hashing ring 1704, having storage nodes 1705, through a LAN link 1706 (for example with HTTP or HTTPS protocol or other suitable protocols). The data center DC1 configuration is replicated to data center DC2. They both access a Dispersed Storage System 1707 through a link 1708. The Dispersed Storage System that could be seen as one entity is, in fact, distributed across the two data centers in storage racks 1709, composed of storage nodes. One property of a Distributed Storage System is to ensure data availability even if one data center fails. Applications (for example, e-mail applications) 1710 access the accessors through a WAN link 1711 and using some data transfer protocol (for example, SMTP—Simple Mail Transfer Protocol; or IMAP—Internet Message Access Protocol; or XMPP—Extensible Messaging and Presence Protocol; or HTTP/HTTPS or any other suitable protocol).

Some portions of the detailed descriptions are presented in terms of algorithms and symbolic representations of operations on data bits within a computer memory. These algorithmic descriptions and representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities. Usually—though not necessarily—these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like refer to the action and processes of a computer system, or similar electronic computing device, that manipulates and transforms data represented as physical (electronic) quantities within its registers and memories into other data similarly represented as physical quantities within the computer system memories or registers or other such information storage, transmission, or display devices.

Some embodiments of the invention also relate to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Reference in the specification to "one embodiment" or "an embodiment" means that a particular feature, structure, or characteristic described in connection with the embodiment is included in at least one embodiment of the present invention. Thus, the use of the phrase "in one embodiment" in various places throughout the specification does not necessarily always refer to the same embodiment. Likewise, the use of the phrases "in another embodiment" and "in an alternate embodiment" in various places throughout the specification does not necessarily always refer to the same embodiment.

A method and system having a probabilistic offload engine for distributed hierarchical object storage devices have been disclosed. It is understood that the embodiments described herein are for the purpose of elucidation and should not be considered to limit the subject matter of the disclosure. Various modifications, uses, substitutions, combinations, improvements, and methods of productions without departing from the scope or spirit of the present invention would be evident to a person skilled in the art.

We claim:

1. A system, comprising:
a first storage system;
a second storage system in communication with the first storage system;
wherein the first storage system and the second storage system are key/value based object storage devices, wherein respective objects kept in the first and second storage system has their own attached meta-data; and
wherein the first storage system and the second storage system store and serve objects;
wherein the system includes a tiered storage system where the first storage system is a higher priority storage system than the second storage system;
wherein the tiered storage system includes a probabilistic algorithm engine to predict access patterns based on a window of objects and to consider object usage variants to identify those of the objects of the tiered storage system that are to be kept within the first storage system, wherein the probabilistic algorithm engine computes a discriminant fair-value, wherein the probabilistic algorithm engine calculates respective fair values of objects to identify based on a comparison with the discriminate fair value those of the objects of the tiered storage system that are to be kept within the first storage system, the fair values calculated as one of more than two values within a numeric range, one end of the range indicating a propensity for storage in the first storage system, the other end of the range indicating a propensity for not being stored in the first storage system.

2. The system of claim 1, wherein the first storage system is a consistent hashing ring used as a clustered storage system.

3. The system of claim 1, wherein the first storage system is a consistent hashing ring used as a clustered storage system and the second storage system is a Dispersed Storage System.

4. The system of claim 1, wherein the determination of the discriminant fair value is based on:
an eviction threshold determined from a total amount of data within the window that is kept in the first storage system and a total amount of data within the window that is not kept in the first storage system;
a distribution of total data of objects within the window having at least a fair value of v, for values of v across the numeric range;
a location of the distribution where the total data of objects is commensurate with the eviction threshold.

5. The system of claim 1, wherein an object's fair value is based on how recently it has been used and how frequently it has been used including:
indicating frequency by incrementing a count each time an object is read;
indicating recency by decaying a value over time after a time at which the object was accessed.

6. The system of claim 1, further comprising a third storage system in communication with the second storage system.

7. The system of claim 1, wherein at least one of the first and second storage systems are implemented with a consistent hashing ring.

8. A computer-implemented method, comprising:
transferring data between a first storage system and a second storage system, wherein the first storage system and the second storage system are key/value based object storage systems that store and serve objects, wherein objects of the first and second storage systems have their own attached meta-data, wherein the first storage system and the second storage system are part of a hierarchical storage system;
executing a probabilistic algorithm based on meta data from a window of objects to determine criteria for judging which of the hierarchical storage system's objects are to be stored in the first storage system, the first storage system to store objects expected to receive greater access activity than objects stored in the second storage system, the executing of the probabilistic algorithm including calculating respective fair values of objects to identify based on a comparison with a discriminate fair value those of the objects of the tiered storage system that are to be kept within the first storage system, the fair values calculated as one of more than two values within a numeric range, one end of the range indicating a propensity for storage in the first storage system, the other end of the range indicating a propensity for not being stored in the first storage system.

9. The computer-implemented method of claim 8, wherein the first storage system is a consistent hashing ring used as a clustered storage system.

10. The computer-implemented method of claim 8, wherein the first storage system is a consistent hashing ring used as a clustered storage system and the second storage system is a Dispersed Storage System.

11. The computer-implemented method of claim 8, wherein the determination of the discriminant fair value is based on:
an eviction threshold determined from a total amount of data within the window that is kept in the first storage system and a total amount of data within the window that is not kept in the first storage system;
a distribution of total data of objects within the window having at least a fair value of v, for values of v across the numeric range;
a location of the distribution where the total data of objects is commensurate with the eviction threshold.

12. The computer-implemented method of claim 11, wherein an object's fair value is based on how recently it has been used and how frequently it has been used including:
indicating frequency by incrementing a count each time an object is read;
indicating recency by decaying a value over time after a time at which the object was accessed.

13. The computer-implemented method of claim 12 wherein the meta data for an object includes any of:
a datum modification time;
a datum size;
a version.

14. The computer-implemented method of claim 8, wherein an object's fair value is based on how recently it has been used and how frequently it has been used including:
indicating frequency by incrementing a count each time an object is read;
indicating recency by decaying a value over time after a time at which the object was accessed.

15. The computer-implemented method of claim 8, wherein at least one of the first and second storage systems are implemented with a consistent hashing ring.

16. A computer readable storage medium comprising program code that when processed by a processing unit causes a method to be performed, said method comprising:
   transferring data between a first storage system and a second storage system, wherein the first storage system and the second storage system are key/value based object storage systems that store and serve objects, wherein objects of the first and second storage systems have their own attached meta-data, wherein the first storage system and the second storage system are part of a hierarchical storage system;
   executing a probabilistic algorithm based on meta data from a window of objects to determine criteria for judging which of the hierarchical storage system's objects are to be stored in the first storage system, the first storage system to store objects expected to receive greater access activity than objects stored in the second storage system, the executing of the probabilistic algorithm including calculating respective fair values of objects to identify based on a comparison with a discriminate fair value those of the objects of the tiered storage system that are to be kept within the first storage system, the fair values calculated as one of more than two values within a numeric range, one end of the range indicating a propensity for storage in the first storage system, the other end of the range indicating a propensity for not being stored in the first storage system.

17. The computer readable storage medium of claim 16, wherein the first storage system is a consistent hashing ring used as a clustered storage system.

18. The computer readable storage medium of claim 16, wherein the first storage system is a consistent hashing ring used as a clustered storage system and the second storage system is a Dispersed Storage System.

19. The computer readable storage medium of claim 16, wherein the determination of the discriminant fair value is based on:
   an eviction threshold determined from a total amount of data within the window that is kept in the first storage system and a total amount of data within the window that is not kept in the first storage system;
   a distribution of total data of objects within the window having at least a fair value of v, for values of v across the numeric range;
   a location of the distribution where the total data of objects is commensurate with the eviction threshold.

20. The computer readable storage medium of claim 19, wherein an object's fair value is based on how recently it has been used and how frequently it has been used including:
   indicating frequency by incrementing a count each time an object is read;
   indicating recency by decaying a value over time after a time at which the object was accessed.

21. The computer readable storage medium of claim 20 wherein the meta data for an object includes any of:
   a datum modification time;
   a datum size;
   a version.

22. The computer readable storage medium of claim 16, wherein if the fair value compares favorably to the discriminant value the object is not stored in the first storage system an object's fair value is based on how recently it has been used and how frequently it has been used including:
   indicating frequency by incrementing a count each time an object is read;
   indicating recency by decaying a value over time after a time at which the object was accessed.

23. The computer readable storage medium of claim 16, wherein at least one of the first and second storage systems are implemented with a consistent hashing ring.

24. The computer readable storage medium of claim 16 wherein the executing of the probabilistic algorithm includes considering object usage variants.

* * * * *